United States Patent Office.

H. STONEBRAKER, OF BALTIMORE, MARYLAND.

Letters Patent No. 62,297, dated February 19, 1867.

---

IMPROVED PAIN-KILLER.

---

The Schedule referred to in these Letters Patent and making part of the same.

---

TO ALL WHOM IT MAY CONCERN:

Be it known that I, H. STONEBRAKER, of Baltimore, in the county of Baltimore, and in the State of Maryland, have invented certain new and useful improvements in "Pain-Killers;" and do hereby declare that the following is a full, clear, and exact description thereof.

My invention consists in compounding and admixing certain chemical ingredients for composing a pain-killer for the cure of diphtheria, croup, sore throat, cramps, colic, cholera morbus, diarrhœa, dysentery, and other diseases, to be taken internally as hereinafter described; and also as a cure for cuts bruises, toothache, &c., to be applied externally. The following are the ingredients composing the medicine:

To 1½ gallon alcohol, add 8¼ ounces camphor; 1⅛ pound balsam Peru, 5¼ ounces laudanum; 6¼ ounces tar turpentine, 8¼ oz. tinct. cayenne; 1½ ounces oil olive, 8½ ounce tinct. myrrh; 4¼ pounds sulp. ether.

This pain-killer is taken as follows: For an adult, one-half a teaspoonful; for children, in proportion to age. For an external remedy apply freely, rubbing in well. For croup and sore throat, take a few drops and bathe the neck and chest well; headache, take a dose, bathe the head, and inhale the fumes.

What I claim, is—

The above described "pain-killer," when composed and used substantially as and for the purposes set forth.

In testimony that I claim the foregoing, I have hereunto set my hand, this first day of December, 1866.

H. STONEBRAKER.

Witnesses:
   J. M. MASON,
   C. M. ALEXANDER.